UNITED STATES PATENT OFFICE.

ROBERT E. TOMMERSON, OF ST. LOUIS, MISSOURI.

PREPARATION FOR TREATING LEATHER.

1,407,449. Specification of Letters Patent. Patented Feb. 21, 1922.

No Drawing. Application filed October 23, 1920. Serial No. 419,061.

*To all whom it may concern:*

Be it known that I, ROBERT E. TOMMERSON, a citizen of the United States, and a resident of the city of St. Louis and State of Missouri, have invented a new and useful Improvement in Preparations for Treating Leather, of which the following is a specification.

My invention relates to preparations for treating leather and has for its principal object to prepare leather for manufacturing by making it pliable and durable.

My invention consists in a preparation having substantially the following composition:

Sodium hyposulphite 7½ ounces (parts) by weight,

Trisodium phosphate 3¾ ounces (parts) by weight,

Sodium bisulphite 1 ounce (part) by weight,

Oxalic acid 1 ounce (part) by weight,

Sulphonated oil 2 ounces (parts) by volume.

This mixture is prepared for use by having a suitable quantity of water, say 1 gallon (128 parts) added thereto.

The trisodium phosphate makes the oil miscible in water and said trisodium phosphate, together with the hyposulphite and the sodium bisulphite, prepares the leather to receive and retain the oil. The oxalic acid may be omitted, as it serves chiefly as a means for bleaching the leather, or any other suitable bleach may be substituted for it.

Tanned leather is hard and brittle and is better adapted for manufacturing if it is softened before use. When leather is treated with the hereinbefore described preparation, it is made soft and pliable and at the same time is made more durable.

I have found that the preparation is used with the best results at a temperature of 120 degrees Fahrenheit.

The proportions of the various ingredients may be changed without changing the properties of the preparation and I do not wish to be limited to the precise proportions hereinbefore stated.

What I claim is:

1. A preparation for treating leather, comprising the following ingredients in substantially the following proportions by weight:

Trisodium phosphate 3¾ parts,
Sulphonated oil 2 parts,
Water.

2. A preparation for treating leather, comprising the following ingredients in substantially the following proportions by weight:

Sodium hyposulphite, 7½ parts,
Trisodium phosphate 3¾ parts,
Sodium bisulphite, 1 part,
Sulphonated oil 2 parts,
Water.

3. A preparation for treating leather, comprising the following ingredients in substantially the following proportions:

Sodium hyposulphite 7½ ounces by weight,
Trisodium phosphate 3¾ ounces by weight,
Sodium bisulphite 1 ounce by weight,
Oxalic acid 1 ounce by weight,
Sulphonated oil 2 ounces by volume,
Water 1 gallon.

Signed at St. Louis, Missouri this 21st day of October, 1920.

ROBERT E. TOMMERSON.